United States Patent
Schott et al.

(10) Patent No.: US 9,304,499 B2
(45) Date of Patent: Apr. 5, 2016

(54) METHOD OF VERIFYING THE CONSISTENCY OF VALUES GIVEN BY AN INCIDENCE PROBE OF AN AIRCRAFT

(71) Applicant: AIRBUS OPERATIONS (SAS), Toulouse (FR)

(72) Inventors: Gregory Schott, Roqueseriere (FR); Benoit Joalland, Tournefeuille (FR); Céline Bourissou, Plaisance du Touch (FR); Xavier Le Tron, Blagnac (FR); Didier Ronceray, Pibrac (FR)

(73) Assignee: Airbus Operations (SAS), Toulouse (FR)

(*) Notice: Subject to any disclaimer, the term of this patent is extended or adjusted under 35 U.S.C. 154(b) by 395 days.

(21) Appl. No.: 13/848,273

(22) Filed: Mar. 21, 2013

(65) Prior Publication Data
US 2013/0317691 A1    Nov. 28, 2013

(30) Foreign Application Priority Data
Mar. 21, 2012    (FR) ..................... 12 52519

(51) Int. Cl.
*G05B 1/01* (2006.01)
*G01P 13/02* (2006.01)
*G01P 21/00* (2006.01)
*G01P 15/00* (2006.01)

(52) U.S. Cl.
CPC ............. *G05B 1/01* (2013.01); *G01P 13/025* (2013.01); *G01P 21/00* (2013.01); *G01P 15/00* (2013.01)

(58) Field of Classification Search
CPC ......... G01P 13/025; G01P 5/16; G01P 21/00; G01P 21/025; B64F 5/0045; B64D 2045/0085
See application file for complete search history.

(56) References Cited

U.S. PATENT DOCUMENTS

| | | | |
|---|---|---|---|
| 5,359,888 A * | 11/1994 | Hagen | 73/178 R |
| 6,073,084 A * | 6/2000 | Le Tron | 702/94 |
| 2002/0184943 A1* | 12/2002 | Collot et al. | 73/170.02 |
| 2004/0011124 A1* | 1/2004 | Choisnet et al. | 73/170.02 |
| 2010/0100260 A1* | 4/2010 | McIntyre et al. | 701/6 |
| 2012/0185181 A1* | 7/2012 | Chankaya et al. | 702/41 |

FOREIGN PATENT DOCUMENTS

EP    1 354 212 B1    9/2004

* cited by examiner

*Primary Examiner* — Jerrah Edwards
*Assistant Examiner* — Paul Castro
(74) *Attorney, Agent, or Firm* — Nixon & Vanderhye P.C.

(57) ABSTRACT

The invention pertains to a method and apparatus for verifying the consistency of the values given by an angle of attack probe of an aircraft. The method and apparatus verifies the proper operation of the angle of attack probe by using the aircraft's vertical load factor measurement provided by an accelerometer to estimate the angle of attack and then comparing the estimated angle of attach with the measure angle of attack.

13 Claims, 3 Drawing Sheets

METHOD OF VERIFYING THE CONSISTENCY OF VALUES GIVEN BY AN INCIDENCE PROBE OF AN AIRCRAFT

This application claims priority to French Patent Application No. 12 52519 filed Mar. 21, 2012, the entire contents of which are hereby incorporated by reference.

BACKGROUND OF THE INVENTION

1. Field of the Invention

The invention pertains to a method for verifying the consistency of values given by an angle of attack probe of an aircraft and to a device implementing this method.

2. Discussion of Prior Art

The control of any aircraft makes it necessary to ascertain its relative speed with respect to the air, that is to say to the relative wind. This speed is determined with the aid of sensors of static pressure Ps, of the total pressure Pt, of the angle of attack α and of the angle of sideslip β. The angle of attack α of an aircraft is commonly defined as being the angle of the air speed vector with respect to a horizontal plane of the aircraft. Likewise, the angle of sideslip β of an aircraft is defined as being the angle of the air speed vector with respect to the vertical plane of the aircraft.

The expression vertical plane of the aircraft, perpendicular to the horizontal plane of the latter, is understood to mean the symmetry plane of the aircraft which is parallel to the fin of the tail empennage of the aircraft. The value of α is traditionally measured by angle of attack probes which dispatch an electrical signal as a function of time, indicative of the locally measured angle of attack. These probes are of vane type, also termed wind vanes, and are generally mounted on the nose of the craft so as to measure the angle of the air speed vector with respect to the horizontal plane of the aircraft. They comprise a movable part which is flush with the skin of the aircraft.

More precisely, FIG. 1 represents such a type of vane probe. The movable vane G overhangs the base S which is implanted in the fuselage. It is understood that the vane G is a sensitive part of the probe since it is subjected to the outside environment. Indeed, such a probe is situated at sensitive locations of the aeroplane and may be damaged by ground maintenance operations, in particular by the use of ladders or cleaning lances, particular meteorological conditions or bird strikes in flight. It may therefore become disabled, distort or break. It is then said to have seized up.

The principle of measuring the angle of attack (AOA) is as follows: the movable part G orients itself along the direction of the local air stream, parallel to the relative wind of the craft. Electronics implanted in the base S measures the angle that the movable part G makes with a reference angle, and converts the difference into an angle of attack measurement signal, which will be denoted $S_\alpha$ subsequently in the description.

For measurement redundancy purposes, modern craft possess several channels for measuring the angle of attack. Each measurement channel comprises a distinct angle of attack probe. In general three probes are implanted on the nose of the craft where the air stream is the least disturbed by the lift-producing elements of the craft. The craft thus comprises three measurement channels, generally each implanted in an ADR ("Air Data Reference") module of an ADIRU ("Air Data Inertial Reference Unit") unit of the craft. A problem arises in the case of a fault with one or more of the probes. Indeed, it is difficult to detect a failure due to the deformation of the vane G.

It is known from patent EP 1 354 212 B1 to verify the consistency between three measurement probes by applying the triplex principle. According to this principle, it is possible to log a defect when one of the probes gives a very different result from the other two. It is then deduced therefrom that this probe is defective. The triplex principle is illustrated in FIGS. 2a and 2b. In FIG. 2a, probes 2 and 3 indicate an angle of attack value of 3° for probe 2 and of 3.1° for probe 3. Probe 1 gives for its part a value of 8° very different from the others. The measurements of probe 1 are therefore rejected.

In other cases, the application of the triplex principle may possibly turn out to be insufficient. Indeed, when two probes give erroneous but mutually consistent readings, the correct measurement is rejected. This case is illustrated in FIG. 2b. Probe 1 gives a value of 8° and probe 3 gives a value of 8.1°. These readings are erroneous but mutually consistent. Probe 2 gives a value of 3°, this in fact being the correct value of angle of attack, but the application of the triplex principle implies that it is the measurements of this probe 2 which are rejected.

The measurements carried out by an angle of attack probe can be used by various electronic systems fitted to an aircraft, such as for example the stall warning device or the system of electric flight controls. It is then understood that it is necessary to know whether the readings given by the angle of attack probes are correct, so as to indicate to the computer whether or not it can take these readings into account.

A first solution consists in having a greater number of probes than that necessary for the measurements or else in installing several systems of additional monitoring probes as is described in patent EP 1 354 212. These solutions lead, however, to problems with integrating these systems into aeroplanes.

A second solution consists in estimating the value of the angle of attack and in comparing the estimated value with the measured value so as to detect possible errors which may arise subsequent to the application of the triplex principle alone. This solution is effective and is generally employed on craft of recent design. To further improve this solution, provision may be made to supplement it with means for verifying the consistency of values given by the angle of attack probes.

One of the objectives of the invention is to provide a system for verifying the consistency of the angle of attack probes which does not require the installation of additional probes.

SUMMARY OF THE INVENTION

This objective is achieved by a method for verifying the consistency of the measurement of an angle of attack probe mounted on an aircraft, the angle of attack probe providing an angle of attack measurement signal, termed a first signal, the method comprising the following successive steps:

E1) analysis and measurement of the amplitude of the variations of the vertical load factor measurement signal, termed a second signal, provided by at least one accelerometer mounted aboard the aircraft;

E2) comparison of the amplitude of the variations of the second signal with a first threshold, the exceeding of the first threshold by a variation of the second signal triggering the following successive steps for a time window of limited duration:

E3) calculation of the amplitude of the variations of the first signal; and

E4) comparison of the amplitude thus calculated with a second threshold;

the measurements provided by the angle of attack probe being identified as inconsistent if the amplitude of the variations of the first signal does not exceed the second threshold for the duration of the time window.

The value of the second threshold is obtained as the product of the amplitude of the variation of the second signal and of a coefficient of proportionality between the variation of the angle of attack and the variation of the vertical load factor of the aircraft, the coefficient of proportionality being given by the following equation:

$$K_{min} = \frac{m \cdot g}{\bar{q} \cdot S \cdot \text{Max}\left(\frac{\partial C_z}{\partial \alpha}\right)}$$

with $\bar{q} = 0.7 \cdot p_s \cdot M^2$ is the kinetic pressure and where m represents the mass of the aeroplane, g the gravity constant, $\bar{q}$ the kinetic pressure, M the Mach number, $p_s$ the static pressure, S the reference area of the aerofoil, $C_z$ the lift coefficient of the aeroplane, and $$\text{Max}\left(\frac{\partial C_z}{\partial a}\right)$$

is the maximum value of the term $$\left(\frac{\partial C_z}{\partial a}\right).$$

Advantageously, the value of the first threshold varies according to the flight point of the aircraft and corresponds to the value of the load factor measurement signal amplitude obtained for a detectable minimum variation of the angle of attack upon the relevant flight point of the aircraft.

As a variant, the value of the first threshold is fixed and corresponds to the value of the load factor measurement signal amplitude obtained for a detectable minimum variation of the angle of attack for a particular flight point of the aircraft.

The invention also pertains to a device for verifying the consistency of the measurements of an angle of attack probe mounted on an aircraft, the probe providing an angle of attack measurement signal, termed first signal, the device being characterized in that it comprises a first and a second sub-system controlled by a microcontroller:

the first sub-system receiving as input the vertical load factor measurement signal, termed second signal, provided by at least one accelerometer mounted aboard the aircraft and providing the microcontroller with a boolean signal indicative of the exceeding of a first threshold by a variation of the second signal, the microcontroller activating the second sub-system for a time window of predetermined duration starting from the instant at which the first threshold is crossed;

the second sub-system receiving as input the first signal, and providing the microcontroller with a boolean signal indicative of the exceeding of a second threshold by the amplitude of the variations of the first signal, the value of the second threshold being provided to the second sub-system by the microcontroller, the measurements provided by the angle of attack probe being identified as inconsistent if the amplitude of the variations of the first signal does not exceed the second threshold for the duration of the time window;

the microcontroller providing a boolean signal indicative of the exceeding of the second threshold by the amplitude of the variations of the first signal.

The variations of the second signal are obtained by a band-pass filtering of the second signal.

The amplitude of the variations of the first signal is obtained by the calculation of the difference between the maximum and the minimum of the variations of the first signal for the duration of the time window.

Preferably, the second sub-system is activated with a delay with respect to the instant at which the first threshold is crossed.

BRIEF DESCRIPTION OF THE DRAWINGS

Other characteristics and advantages of the invention will become apparent on reading the preferential embodiment of the invention given with reference to the attached figures among which.

DETAILED DISCUSSION OF EMBODIMENTS

Figure 1:
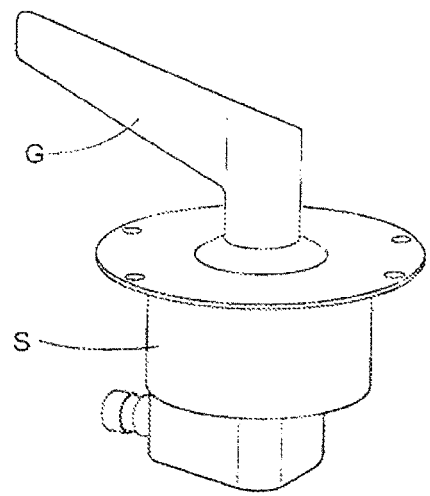
FIG. 1, already described, illustrates a probe of the vane type used in the invention.
Figure 2A:
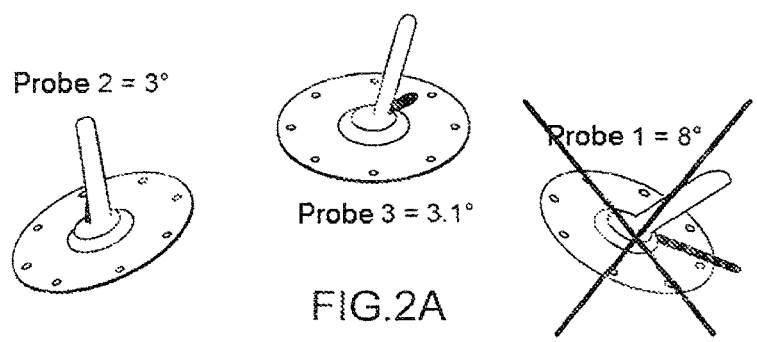
FIG. 2a illustrates a set of three probes where one of the probes gives an erroneous value, very different from those provided by the other two probes.
Figure 2B:
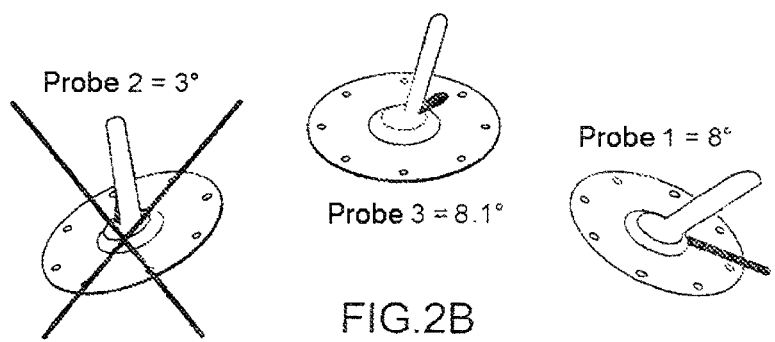
FIG. 2b illustrates the problem posed by the application of the triplex principle alone in a set of three probes.

The angle of attack probes used according to the invention are of the vane type ("weather vane"), that is to say they comprise a vane mounted on a pivot in such a way that the vane is positioned in the local air stream, parallel to the relative wind of the craft. An example of such an angle of attack probe has already been described in conjunction with FIG. 1.

The idea underlying the invention is to utilize the physical correlation existing between the angle of attack α and the vertical load factor of an aircraft $N_z$ so as to verify the consistency of the measurements provided by an angle of attack probe mounted on an aircraft. To this end, the invention proposes to test the consistency of the measurements of angle of attack α provided by an angle of attack probe on the basis of the analysis of the variations of a measurement of the load factor at the centre of gravity of the aircraft.

The device implementing the invention is designed to be simple, effective and robust, and to adapt easily to an already existing system of angle of attack probes. Indeed, the device for measuring the vertical load factor at the centre of gravity of the aircraft $N_z$ is an apparatus of the accelerometer type, with which aeroplanes are necessarily already equipped. Moreover, since the accelerometer is situated aboard the aircraft, the measurement that it provides is independent of the outside conditions to which the aircraft is subjected. The measurement of the vertical load factor is consequently a reliable measurement.

The physical correlation between the angle of attack and the vertical load factor is expressed in the lift relation, namely:

$$m \cdot g \cdot N_z = 0.7 \cdot p_s \cdot M^2 \cdot S \cdot C_z = \bar{q} \cdot S \cdot C_z \qquad (1)$$

with $\bar{q} = 0.7 \cdot p_s \cdot M^2$ as noted earlier, and where m represents the mass of the aeroplane (in kg), g the gravity constant (in m·s$^{-2}$), N the vertical load factor at the centre of gravity of the aircraft (dimensionless), $\bar{q}$ the kinetic pressure (in Pa), M is the Mach number (dimensionless), $p_s$ the static pressure (in Pa), S is the reference area of the airfoil (in m²) and finally $C_z$ is the lift coefficient of the aircraft. The value of the lift coefficient of the aeroplane $C_z$ depends in particular on the angle of attack α, hence there is a physical correlation existing between α and $N_z$.

Figure 3:
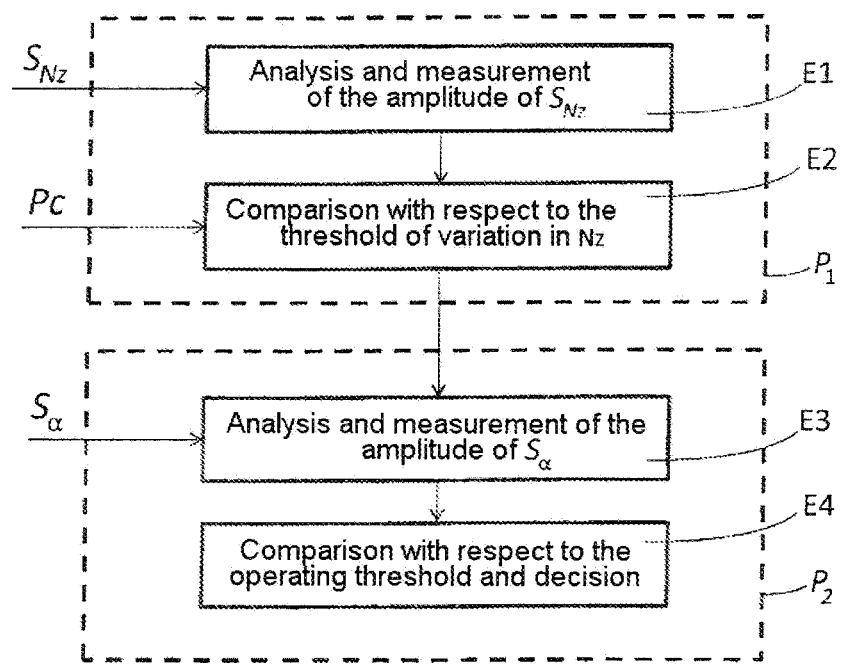
FIG. 3 represents, in a schematic manner, the steps of the method for verifying the consistency of values given by an angle of attack probe according to one embodiment of the invention.

FIG. 3 represents, in a schematic manner, the steps of the method for verifying the consistency of values given by an angle of attack probe according to the invention. More precisely, the signals taken into account in the method according to the invention are on the one hand the raw angle of attack measurement signal $S_α$ provided by the angle of attack probe and on the other hand the vertical load factor measurement signal $S_{Nz}$ given by an accelerometer situated inside the aircraft. The expression raw signal is understood to mean a signal devoid of any correction.

The method for verifying the consistency of the measurement of an angle of attack probe A can be considered to be a two phase process i.e., a first phase $P_1$ and a second phase $P_2$ which is limited over time and is conditioned by the exceeding of a threshold during a step of the first phase.

The first phase $P_1$ comprises two steps, E1 and E2. The first step E1 is the analysis of the variations of the vertical load factor measurement signal $S_{Nz}$ provided by at least one accelerometer. The variations of the vertical load factor measurement signal $S_{Nz}$ are analysed and the value of the amplitude $A_{S_{Nz}}$ of this signal is measured. During the second step E2, the measured amplitude is continuously compared with a first threshold which is a threshold of variation of $N_z$, and is denoted $ε_1$ subsequently in the description.

Preferably, the value of the threshold $ε_1$ varies in accordance with the flight direction of the aircraft, denoted $P_C$, so as to adapt the sensitivity of the detection to the flight direction of the aircraft. This advantageous characteristic will be described subsequently in the description. As a variant, the value of this threshold is fixed and determined by simulation so that the detection method is effective for all the flight directions of the aircraft. The expression flight direction $P_C$ of the aircraft is understood to mean the latter's speed and altitude pair.

When the amplitude of the variations of the vertical load factor measurement signal $S_{Nz}$ exceeds the threshold $ε_1$, then the second phase $P_2$ is implemented for a time window of duration T, and the first phase $P_1$ is interrupted. The amplitude of the variation which is greater than the threshold $ε_1$ is denoted $A_{Nz}$ subsequently in the description. It corresponds to the amplitude of a significant variation of the load factor with which is normally associated a significant variation of the angle of attack at the relevant flight direction $P_C$.

The duration T of the time window is counted down from the instant at which the threshold $ε_1$ is exceeded. The second phase $P_2$ is implemented only for the duration of the time window opened by the exceeding of the threshold $ε_1$. Indeed, it is understood that the implementation of the second phase is limited so as to chart only the variations of angle of attack α subsequent to the detected significant variation of the vertical load factor $N_z$.

The second phase $P_2$ consists of the verification of a variation of the angle of attack α relating to the detected significant variation of the load factor $N_z$. The first step E3 of the second phase $P_2$ consists in analysing the variations of the measurement signal for the angle of attack α during the time window T and in measuring the amplitude of the variations of the angle of attack measurement signal.

The second step E4 of the second phase comprises the comparison of the amplitude calculated in step E3 and with a second threshold, termed the operating threshold and denoted $ε_2$ subsequently in the description. The result of the comparison performed in step E4 makes it possible to obtain a confirmation as regards the consistency of the measurements given by the relevant angle of attack probe.

Indeed, if for the time window of duration T, the amplitude of the variation of the angle of attack measurement signal $S_α$ exceeds the threshold $ε_2$, then the values given by the angle of attack probe are consistent. On the other hand, if, on completion of the time window of duration T, the amplitude of the variation of the angle of attack measurement signal has not exceeded the threshold $ε_2$, then the probe A is considered to be defective. In this case, the measurement signal $S_α$ provided by the probe A is no longer utilized by the onboard electronics of the craft.

On completion of the time window T, the method is reinitialized. More precisely, the consistency of the measurements of the probe will be verified again when a meaningful variation of the vertical load factor of the aircraft is detected. The measurements provided by an angle of attack probe deemed defective can also be definitively invalidated for the whole of the duration of the flight, until the ground maintenance teams verify the proper operation of the probe in question. In this case, the method according to the invention is not reinitialized after the angle of attack probe has been deemed defective.

Figure 4:
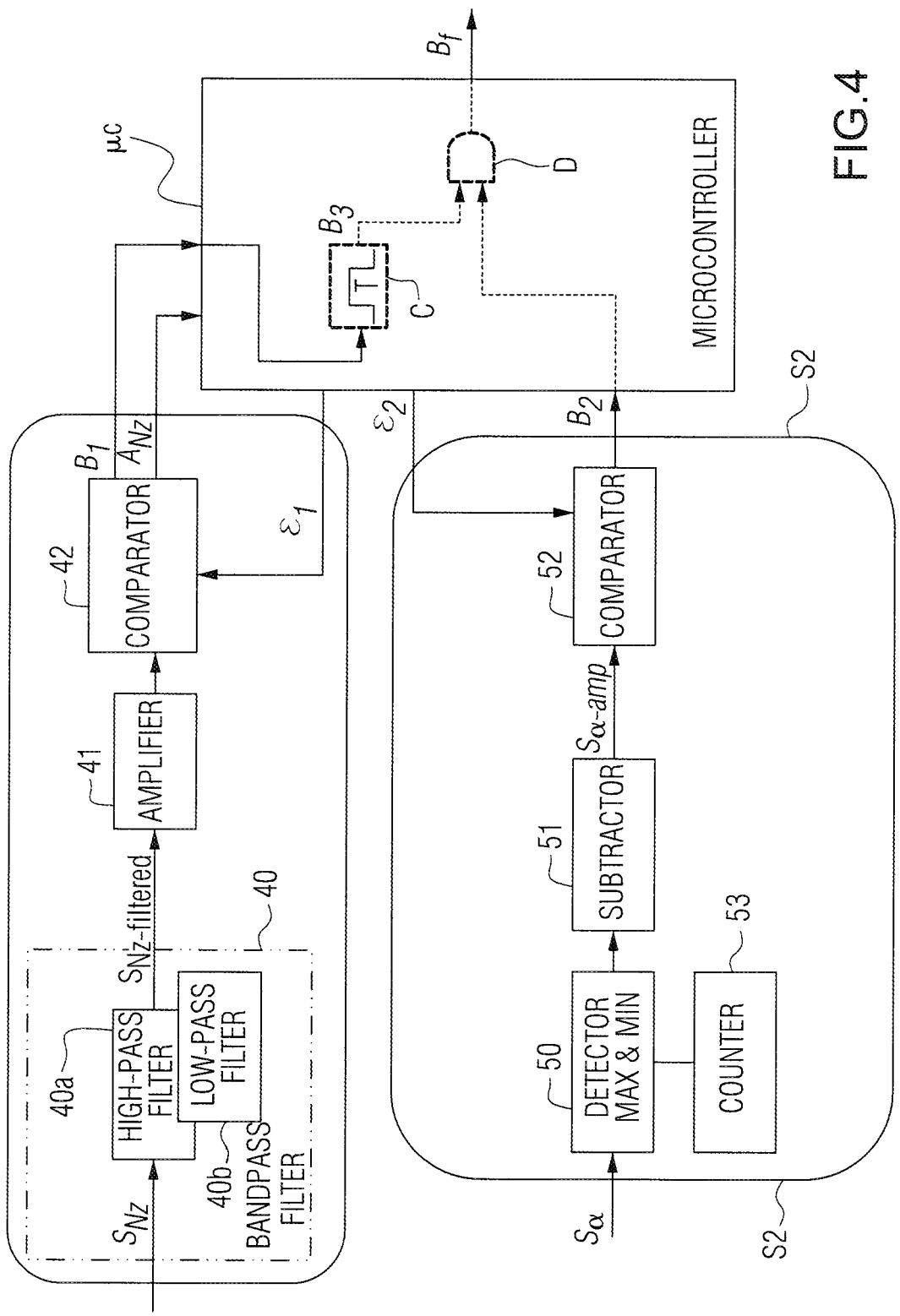
FIG. 4 illustrates a schematic of a device implementing the method for verifying the consistency of the measurement of an angle of attack probe according to a preferred embodiment of the invention.

FIG. 4 illustrates a schematic of a device implementing the method for verifying the consistency of the measurement of an angle of attack probe A according to an embodiment of the invention. The device can also be considered to be two sub-systems: a first sub-system S1 for detecting the significant variation of the load factor $N_z$ which performs the steps of the first phase of the method described above, and a second sub-system S2 for verifying variation of the angle of attack α which performs the steps of the second phase of the method described above. The activation of the second sub-system S2 is conditioned by the triggering of a logic condition at the level of the first sub-system S1. Finally, the two sub-systems S1, S2 are controlled by a microcontroller μc. The latter, in a conventional manner, comprises a processor, volatile and non-volatile memories, and input-output interfaces so as to communicate with other onboard electronic elements.

The first sub-system S1 receives as input the aircraft load factor measurement signal $S_{Nz}$ provided by an accelerometer. This signal is filtered by a bandpass filter 40. The low-pass filter 40b is used to remove the noise from the load factor measurement signal $S_{Nz}$, especially where the noise may be due to structural vibrations. The high-pass filter 40a makes it possible for to remove the continuous component of the signal $S_{Nz}$ which may be due to measurement biases and to direct variations of the lift of the craft. Indeed, the lift of the craft, correlated with its load factor as shown by equation (1), can vary as a function of the various aerodynamic configurations of the craft, for example when deploying the airbrakes, flaps or undercarriages.

Thus by virtue of the bandpass filter 40, only the variations of the signal $S_{Nz}$ are taken into account subsequently in the method. The signal output by the filter 40 is denoted $S_{Nz-filtered}$. Advantageously, an amplifier 41 is disposed at the output of the bandpass filter 40 so as to adjust the filtered signal level $S_{Nz-filtered}$, in order to compensate for the attenuation of the filters 40a and 40b.

On output from the amplifier 41, the amplitude of the filtered and amplified signal is compared with the threshold $ε_1$, by means of the comparator 42. More precisely, the value of the threshold $ε_1$ corresponds to the value of the load factor measurement signal amplitude obtained for a detectable minimum variation of the angle of attack α at a certain flight direction $P_C$ of the aircraft. The value of the threshold $\epsilon_1$ is provided to the comparator 42 by the microcontroller μc. This threshold is determined on the basis of the detection resolution of the angle of attack probe and as a function of the characteristics of the aircraft.

Preferably, the value of the threshold $\epsilon_1$ is variable as a function of the aircraft flight condition. More precisely, the non-volatile memory of the microcontrollers includes a table in which the values of the threshold $\epsilon_1$ corresponding to various flight directions are recorded. The microcontroller μc receives from the onboard electronics, information about the aircraft's current flight conditions and transmits, after reading the table, the appropriate value of the threshold $\epsilon_1$ to the comparator 42.

The table of the various thresholds $\epsilon_1$ can be established by computer simulation as a function of the characteristics of the aircraft. The simulations can be more or less thorough and take into account for example the mass of the craft as a function of the onboard fuel and of its cargo. As a variant, the value of the threshold $\epsilon_1$ can be fixed. In this case, the fixed value of $\epsilon_1$ will be determined, by simulation, in such a way that the threshold is suited to the whole set of flight conditions of the craft.

The comparator 42 dispatches a boolean signal $B_2$ to the microcontroller μc. When the amplitude of the variations of the load factor measurement signal $S_{Nz}$ exceeds the threshold $\epsilon_1$, the state of the boolean signal $B_1$ switches to 1 under positive logic (or to 0 under negative logic). In this case, the microcontroller μc activates the second sub-system S2 for a logic window of duration T. Subsequently in the description, $T_0$ will denote the start of the time window of duration T, and $T_f$ its end. The duration of the logic window T is in a conventional manner, counted by an internal clock or one external to the microcontroller μc.

The amplitude $A_{Nz}$ of the significant variation of the load factor measurement signal is recorded in the volatile memory of the microcontroller μc. The duration T is chosen so as to detect a variation of the angle of attack α relating to the significant variation of the vertical load factor $N_z$. Advantageously, the duration T is of the order of 5 to 15 seconds. The second sub-system S2 comprises a detector 50 which receives as input the raw aircraft angle of attack measurement signal $S_\alpha$ provided by the angle of attack probe. It also includes a subtractor 51 and a comparator 52.

Advantageously, the microcontroller μc imposes an adjustable delay (τ<T), between $T_0$ and the instant at which the detector receives the raw angle of attack measurement signal $S_\alpha$ provided by the tested angle of attack probe. The delay τ corresponds to the settling time for the variations of the load factor in response to a significant variation of the angle of attack. Between $T_0+\tau$ and $T_f$, the detector 50 detects the maxima and the minima of the raw angle of attack measurement signal.

The detector is associated with a counter 53 which is incremented at each maximum and each minimum detected in the time period lying between $T_0+\tau$ Tf. The values of the maximum and the minimum are stored in a memory of the microcontroller μc, for example a volatile memory. At each new incrementation of the counter 53, the subtractor 51 subtracts the maximum from the minimum so as to obtain the maximum amplitude of the variations of the raw angle of attack measurement signal $S_\alpha$.

According to a variant, the microcontroller μc can fulfil the functions allotted to the hereinabove described subtractor and counter. The signal $S_{\alpha\text{-}amp}$ output by the subtractor 51 is provided to the comparator 52 in which the signal amplitude is compared with the threshold $\epsilon_2$. The value of the threshold $\epsilon_2$ is provided to the comparator 52 by the microcontroller μc. The value of the threshold $\epsilon_2$ is obtained as the product of the amplitude $A_{Nz}$ and of a coefficient of proportionality $K_{min}$ making it possible to correlate the angle of attack variations $\partial\alpha$ and the load factor variations $\partial N_z$.

The obtaining of the value of $K_{min}$ will now be described. By differentiating equation 1, the following equation is obtained:

$$\frac{\partial\alpha}{\partial N} = \frac{m.g}{\bar{q}.S\frac{\partial C_z}{\partial\alpha}} \quad (2)$$

$$\text{with } K = \frac{m.g}{\bar{q}.S\frac{\partial C_z}{\partial\alpha}} \quad (3)$$

For a minimum value of K, denoted Min(K), the following inequality is obtained:

$$\partial\alpha \geq K_{min} \cdot \partial N_Z \quad (4)$$

On the basis of equation 4, for a given variation $\partial N_z$ of the load factor, it is possible to define a threshold of variation of the angle of attack $\partial\alpha$.

The value $K_{min}$ is obtained when the ratio $$\frac{\partial\alpha}{\partial N_z}$$

is a minimum. This ratio is a minimum when $$\frac{\partial C_z}{\partial\alpha}$$

is a maximum, since the other terms are determined by the specifications of the aircraft. The maximum value of the term $$\frac{\partial C_z}{\partial\alpha},$$

denoted $$\text{Max}\left(\frac{\partial C_z}{\partial\alpha}\right),$$

is obtained by means of computer simulations over the whole of the flight domain of the aircraft. An exhaustive sweep of the flight domain is thus carried out. The value of $K_{min}$ is:

$$K_{min} = \frac{m.g.}{\bar{q}.S.\text{Max}\left(\frac{\partial C_z}{\partial\alpha}\right)} \quad (5)$$

The value $K_{min}$ thus determined does not depend on the variations of the angle of attack $\partial\alpha$ nor variations in the lift coefficient of the aircraft $\partial C_z$. On the other hand, the value of $K_{min}$ is adaptive as a function of the specifications of the aircraft, in particular as a function of its mass m. The various values of $K_{min}$, obtained by means of computer simulations, are recorded in the non-volatile memory of the microcontroller μc.

As a variant, the value of $K_{min}$ may be obtained without recourse to computer simulations, but by considering as an approximation that $$\frac{\partial C_z}{\partial \alpha}$$

is constant. In this case, the value of $K_{min}$ is obtained for the minimum value of the mass m and for the maximum value of the kinetic pressure $\bar{q}$ of the aircraft. The comparator 52 dispatches a boolean signal $B_2$ to the microcontroller µc to indicate whether the threshold $\epsilon_2$ is exceeded. When the threshold $\epsilon_2$ is exceeded, the state of the boolean signal $B_2$ switches to 1 under positive logic (or to 0 under negative logic).

Finally, an AND logic gate D implemented in the microcontroller receives as input the boolean signal $B_2$ arising from the comparator 52, as well as a boolean signal $B_3$ relating to the opening of the logic window T. The signal $B_3$ is generated by a logic element C in the microcontroller. Elements C and D are indicated in phantom lines as they are part of the microcontroller. The boolean signal $B_3$ has a state equal to 1 under positive logic (or to 0 under negative logic) in the time period lying between $T_0+\tau$ and Tf.

The output of the AND logic gate D is a boolean signal $B_f$ which is dispatched to the onboard electronics of the aircraft, for example the onboard computer. If during the time window T, the state of the boolean signal $B_f$ switches to 1 under positive logic (or to 0 under negative logic), then the onboard electronics of the craft considers that the angle of attack probe is operating correctly. On completion of the time window T, the method for verifying the angle of attack probe can be reinitialized.

On the other hand, if the state of the boolean signal $B_f$ remains equal to 0 under positive logic (or to 1 under negative logic) for the duration of opening of the logic window of duration T, or if the duration T has elapsed, then the onboard electronics of the craft considers that the angle of attack probe is defective.

The device which has just been described, according to a preferred embodiment for embodying the invention, is characterized by a high degree of integration and a total independence in relation to the circuits for measuring the angle of attack and vertical load factor. For example, this device can be implemented as a supplement to the circuits for measuring the angle of attack of aircraft whose onboard systems have to be reupdated, in particular in the case of renovation ("retrofit") of a fleet.

The invention claimed is:

1. A method for verifying the consistency of an angle of attack probe mounted on an aircraft, where said angle of attack probe provides a first signal, the method comprising:
    measuring variations in amplitude of a second signal comprising a vertical load factor measurement signal, said second signal provided by at least one accelerometer mounted aboard the aircraft; and
    comparing with a first threshold the measured variations in amplitude of said second signal, and, if said measured variations in amplitude exceeds said first threshold, then performing the following steps during a time window of limited duration:
        measuring variations in amplitude of said first signal during said time window; and
        comparing with a second threshold the measured variations in amplitude of said first signal, wherein said first signal is identified as inconsistent if the measured variations in amplitude of the first signal do not exceed the second threshold during said duration of said time window.

2. A method for verifying the consistency of the measurement of an angle of attack probe mounted on an aircraft, the angle of attack probe providing an angle of attack measurement signal ($S_\alpha$), termed a first signal, the method comprising successively:
    E1) analysis and measurement of variations in amplitude of a vertical load factor measurement signal ($S_{NZ}$), termed a second signal, provided by at least one accelerometer mounted aboard the aircraft;
    E2) comparison of the variations in amplitude of the second signal with a first threshold ($\epsilon_1$), an exceeding of the first threshold by a variation in amplitude of the second signal triggering the following successive steps for a time window of limited duration (T):
    E3) calculation of variations in amplitude of the first signal; and
    E4) comparison of the variations in amplitude of the first signal thus calculated with a second threshold ($\epsilon_2$);
    the measurements of variations in amplitude provided by the angle of attack probe being identified as inconsistent if the variations in amplitude of the first signal do not exceed the second threshold during the duration (T) of the time window.

3. The method according to claim 2, wherein the value of the second threshold ($\epsilon_2$) is obtained as the product of the variation in amplitude ($A_{Nz}$) of the second signal and of a coefficient of proportionality ($K_{min}$) between the variation of the angle of attack ($\alpha$) and the variation of the vertical load factor ($N_z$) of the aircraft, the coefficient of proportionality being given by the following equation:

$$K_{min} = \frac{m.g.}{\bar{q}.S.\text{Max}\left(\frac{\partial C_z}{\partial \alpha}\right)}$$

with $\bar{q}=0.7 \cdot p_s \cdot M^2$ is the kinetic pressure
    and where m represents the mass of the aircraft, g is the gravity constant, $\bar{q}$ is the kinetic pressure, M is the Mach number, $p_s$ is the static pressure, S is the reference area of the aerofoil, $C_z$ the lift coefficient of the aircraft, and $$\text{Max}\left(\frac{\partial C_z}{\partial a}\right)$$

is the maximum value of the term $$\left(\frac{\partial C_z}{\partial a}\right).$$

4. The method according to claim 2, wherein the value of the first threshold ($\epsilon_1$) varies according to the flight direction (Pc) of the aircraft and corresponds to the value of the load factor measurement signal ($S_{NZ}$) amplitude obtained for a detectable minimum variation of the angle of attack ($\alpha$) upon the relevant flight point (Pc) of the aircraft.

5. The method according to claim 2, wherein the value of the first threshold ($\epsilon_1$) is fixed and corresponds to the value of the load factor measurement signal ($S_{NZ}$) amplitude obtained for a detectable minimum variation of the angle of attack ($\alpha$) for a particular flight point (Pc) of the aircraft.

6. An apparatus for verifying the consistency of the measurements of an angle of attack probe mounted on an aircraft, where said probe provides angle of attack measurements in the form of a first signal, said apparatus comprising:
   a microcontroller,
   a first sub-system, and
   a second sub-system,
   said first subsystem including an accelerometer mounted in said aircraft and configured to measure variations in a vertical load factor of said aircraft and provide a second signal comprised of a boolean signal to said microcontroller indicative of the variations exceeding a first threshold, the microcontroller, in response to said variations exceeding said first threshold, configured to activate the second sub-system for a time window of predetermined duration starting from an instant at which the variations exceed said first threshold; and
   said second subsystem, responsive to said first signal, configured to provide the microcontroller with a boolean signal indicative variations in amplitude of the first signal exceeding a second threshold, said second threshold provided by the microcontroller, the probe being identified as inconsistent if the variations in amplitude of the first signal do not exceed the second threshold for the duration of the time window,
   wherein the microcontroller is configured to provide a boolean output signal indicative of the exceeding of the second threshold by the variations in amplitude of the first signal.

7. An apparatus for verifying the consistency of the measurements of an angle of attack probe mounted on an aircraft, the probe providing an angle of attack measurement signal ($S_\alpha$), termed a first signal, the apparatus comprising:
   a first (S1) sub-system controlled by the microcontroller ($\mu c$), and
   a second (S2) sub-system controlled by the microcontroller ($\mu c$),
   the first sub-system (S1) receiving as input a vertical load factor measurement signal ($S_{NZ}$), termed a second signal, provided by at least one accelerometer mounted aboard the aircraft and providing the microcontroller with a boolean signal ($B_1$) indicative of the exceeding of a first threshold ($\epsilon_1$) by a variation in vertical load factor measurements of the second signal, the microcontroller activating the second sub-system (S2) for a time window of predetermined duration (T) starting from an instant ($T_0$) at which the first threshold is crossed;
   the second sub-system (S2) receiving as input the first signal, and providing the microcontroller with a boolean signal ($B_2$) indicative of the exceeding of a second threshold ($\epsilon_2$) by variations in amplitude of the first signal, the value of the second threshold being provided to the second sub-system by the microcontroller, the measurements provided by the angle of attack probe (A) being identified as inconsistent if the variations in amplitude of the first signal do not exceed the second threshold for the duration (T) of the time window;
   the microcontroller providing a boolean signal ($B_f$) indicative of the exceeding of the second threshold by the variations in amplitude of the first signal.

8. The apparatus according to claim 7, wherein the value of the second threshold ($\epsilon_2$) is obtained as the product of the variation in amplitude ($A_{NZ}$) of the second signal and of a coefficient of proportionality $K_{min}$ between the variation of the angle of attack ($\alpha$) and the variation of the vertical load factor ($N_Z$) of the aircraft (C), the coefficient of proportionality being given by the following equation:

$$K_{min} = \frac{m.g.}{\overline{q}.S.\text{Max}\left(\frac{\partial C_z}{\partial \alpha}\right)}$$

with $\overline{q}=0.7 \cdot p_s \cdot M^2$ is the kinetic pressure
and where m represents the mass of the aircraft, g the gravity constant, $\overline{q}$ is the kinetic pressure, M is the Mach number, $p_s$ is the static pressure, S the reference area of the aerofoil, $C_z$ the lift coefficient of the aeroplane, and $$\text{Max}\left(\frac{\partial C_z}{\partial a}\right)$$

is the maximum value of the term $$\left(\frac{\partial C_z}{\partial a}\right).$$

9. The apparatus according to claim 7, wherein the value of the first threshold ($\epsilon_1$) varies according to the flight direction (Pc) of the aircraft and corresponds to the value of the load factor measurement signal ($S_{NZ}$) amplitude obtained for a detectable minimum variation of the angle of attack ($\alpha$) upon the relevant flight direction (Pc) of the aircraft, the value of the first threshold is provided to the first sub-system by the microcontroller.

10. The apparatus according to claim 7, wherein the value of the first threshold ($\epsilon_1$) is fixed and corresponds to the value of the load factor measurement signal ($S_{NZ}$) amplitude obtained for a detectable minimum variation of the angle of attack ($\alpha$) for a particular flight direction (Pc) of the aircraft.

11. The apparatus according to claim 7, wherein the second signal is applied to a bandpass filter to obtain variations in said second signal.

12. The apparatus according to claim 7, wherein the first signal is applied to a max/min detector which is configured to provide the difference between the maximum and the minimum of the variations of the first signal for the duration (T) of the time window.

13. The apparatus according to claim 7, wherein activation of said second sub-system (S2) is responsive to a delay (T) with respect to the instant ($T_0$) at which the first threshold is crossed.

* * * * *